(12) United States Patent
Huang

(10) Patent No.: US 7,940,920 B2
(45) Date of Patent: May 10, 2011

(54) TELECOMMUNICATION CAPABLE OF SILENT OPERATION AND THE RELATED METHOD THEROF

(75) Inventor: Yung-Yu Huang, Taipei County (TW)

(73) Assignee: Lite-On Technology Corp., Taipei (TW)

( * ) Notice: Subject to any disclaimer, the term of this patent is extended or adjusted under 35 U.S.C. 154(b) by 1245 days.

(21) Appl. No.: 11/548,703

(22) Filed: Oct. 12, 2006

(65) Prior Publication Data

US 2007/0263844 A1 Nov. 15, 2007

(30) Foreign Application Priority Data

May 12, 2006 (CN) .......................... 2006 1 0081832

(51) Int. Cl.
*H04M 1/00* (2006.01)
*H04M 3/00* (2006.01)

(52) U.S. Cl. .................................. 379/376.02

(58) Field of Classification Search .................. 379/413, 379/376.02
See application file for complete search history.

(56) References Cited

U.S. PATENT DOCUMENTS 7,013,007 B1 * 3/2006 Chouldjian et al. .......... 379/413
* cited by examiner

*Primary Examiner* — Alexander Jamal
(74) *Attorney, Agent, or Firm* — Rosenberg, Klein & Lee

(57) ABSTRACT

Disclosed is a telecommunication system including a main telecommunication apparatus, at least one slave telecommunication apparatus and a virtual signal circuit. The slave telecommunication apparatus is coupled to the main telecommunication apparatus. The virtual signal circuit, which is coupled to the main telecommunication apparatus and the slave telecommunication apparatus, is used for generating a DC virtual signal to the slave telecommunication apparatus in a silent operation mode and for transmitting a telecommunication signal to the slave telecommunication apparatus in a normal operation mode to recover the original telecommunication function and operation.

19 Claims, 4 Drawing Sheets

TELECOMMUNICATION CAPABLE OF SILENT OPERATION AND THE RELATED METHOD THEROF

BACKGROUND OF THE INVENTION

1. Field of the Invention

The present invention relates to a telecommunication system and a related method thereof, and more particularly, to a telecommunication system capable of silent operation and a related method thereof.

2. Description of the Prior Art

Since its invention, the telecommunication system has become a most important communication tool. A telecommunication system not only provides a basic communication function, but many recent telecommunication systems further include extra functions, such as fax machines, answering machines, and multi-function peripheral (MFP).

Traditionally, a telecommunication system includes a tip terminal, which is always coupled to the ground, and a ring terminal, which receives a telecommunication signal from PSTN (Public Switched Telephone Network). The telecommunication signal is an AC (alternating current) signal, which enables a ring of the telecommunication system to sound.

Depending on the location of the telecommunication system, a ringing tone is not always practical, and therefore an ideal telecommunication system should be capable of informing the user that a telecommunication signal has been received without sounding the ring, i.e. in a silent way (mode). At present, a user can only set a silent operation for a main telecommunication apparatus of the telecommunication system, while a slave telecommunication apparatus still rings when the telecommunication signal is received. Thus, to provide a user with added convenience, it is necessary that the silent operation of the slave telecommunication apparatus can be set through the main telecommunication apparatus.

Thus, a novel invention is needed for the above requirements.

SUMMARY OF THE INVENTION

One objective of the present invention is to provide a telecommunication system capable of silent operation, which utilizes a virtual signal circuit to generate a DC (direct current) virtual signal to a slave telecommunication apparatus serially coupled to the main telecommunication apparatus, wherein the virtual signal circuit has a silent operation mode to enable the main and slave telecommunication apparatus to operate silently.

Another objective of the present invention is to provide a telecommunication system capable of silent operation, which transforms a low voltage inside the telecommunication system to generate a DC virtual signal that obeys prescribed safety rules to provide the DC virtual signal to the slave telecommunication apparatus.

According to the disclosed invention, a telecommunication system including a main telecommunication apparatus, at least one slave telecommunication apparatus, and a virtual signal circuit is provided. The slave telecommunication apparatus is coupled to the main telecommunication apparatus. The virtual signal circuit, which is coupled to the main telecommunication apparatus and the slave telecommunication apparatus, is used for generating a DC virtual signal to the slave telecommunication apparatus in a silent operation mode and for transmitting a telecommunication signal to the slave telecommunication apparatus in a normal operation mode to recover the original telecommunication function and operation. The main telecommunication apparatus and the slave telecommunication apparatus can be a telephone machine, fax machine, answering machine or multi-function peripheral.

In one embodiment of the invention, the virtual signal circuit generates a DC virtual signal corresponding to a second voltage level which is according to a first voltage level to the slave telecommunication apparatus in the silent operation mode, wherein the second voltage level is higher than or equal to the first voltage level.

Additionally, the virtual signal circuit comprises a voltage transformer. The voltage transformer, which is coupled to the main telecommunication apparatus and the first voltage level, is used for generating the DC virtual signal corresponding to the second voltage level, which, in turn, is according to the first voltage level. The telecommunication system further comprises a slave telecommunication apparatus relay, which comprises first input ports for receiving the DC virtual signal, second input ports for receiving the telecommunication signal, and output ports coupled to the slave telecommunication apparatus. The slave telecommunication apparatus relay makes the first input ports and the output ports contact in the silent operation mode, and the slave telecommunication apparatus relay makes the second input ports and the output ports contact in the normal operation mode.

In one embodiment of the invention, the voltage transformer can be a switching power transformer comprising a transistor, a transformer and a rectifier circuit. The transistor, which is coupled to the pulse width modulation signal, turns on or off according to the pulse width modulation signal. The transformer, which is coupled to the transistor, is used for generating the second voltage level according to the first voltage level and the operation of the transistor. The rectifier circuit, which is coupled to the transformer, is used for rectifying the second voltage level to generate the DC virtual signal corresponding to the second voltage level. The voltage transformer further comprises a voltage stabilizing rectifying circuit, for providing the stable first voltage level to the transformer.

Alternatively, the virtual signal circuit can be coupled to a DC voltage source inside the telecommunication system to utilize the voltage from the DC voltage source as the DC virtual signal to the slave telecommunication apparatus in the silent operation mode.

The disclosed invention also discloses a method for silently operating a telecommunication system, which includes a main telecommunication apparatus and at least one slave telecommunication apparatus serially coupled to the main telecommunication apparatus. The method includes: utilizing the main telecommunication apparatus to receive a telecommunication signal; determining whether the telecommunication system operates in a silent operation mode or a normal operation mode; generating a DC virtual signal to the slave telecommunication apparatus if the telecommunication system operates in the silent operation mode; or transmitting the telecommunication signal to the slave telecommunication apparatus if the telecommunication system operates in the normal operation mode.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
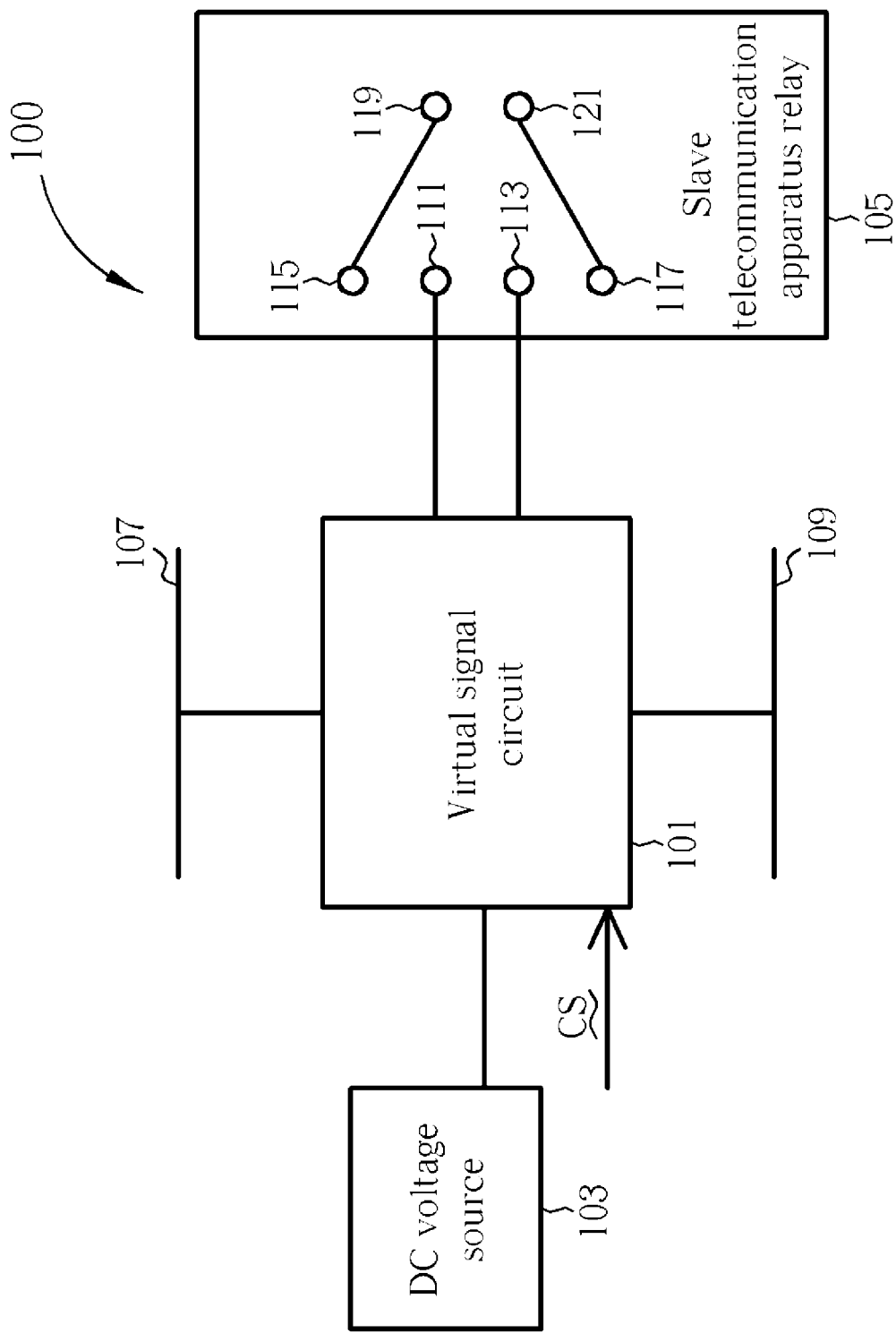
FIG. 1 is a schematic diagram illustrating a telecommunication system applying a virtual signal circuit according to the preferred embodiment of the present invention.

FIG. 1 is a schematic diagram illustrating a telecommunication system 100 applying a virtual signal circuit 101 according to the preferred embodiment of the present invention. As shown in FIG. 1, the telecommunication system 100 includes a virtual signal circuit 101, a DC voltage source 103, a slave telecommunication apparatus relay 105, a tip terminal 107, and a ring terminal 109. The virtual signal circuit 101 is always located in a main telecommunication apparatus (not shown), but this is not a limitation of the scope of the present invention. The main telecommunication apparatus and slave telecommunication apparatus can be a telephone machine, fax machine, answering machine or a multifunction peripheral.

The slave telecommunication apparatus relay 105 includes a first input port 111, 113, a second input port 115, 117 and an output port 119, 121. The first input ports 111, 113 are coupled to the virtual signal circuit 101 for receiving the DC virtual signal. The second input port 115, 117 are coupled to the tip terminal 107 and the ring terminal 109 respectively for receiving the telecommunication signal. The output ports 119, 121 are coupled to the slave telecommunication apparatus. The slave telecommunication apparatus relay 105 makes the first input ports 111, 113 and the output port 119, 121s contact in a silent operation mode, and the slave telecommunication apparatus relay 105 makes the second input ports 115, 117 and the output ports 119, 121 contact in a normal operation mode.

Therefore, the slave telecommunication apparatus relay 105 contacts to the tip terminal 107 and the ring terminal 109 for transmitting the telecommunication signal from the tip terminal 107 and the ring terminal 109 to the slave telecommunication apparatus to enable the ring to sound in the normal operation mode. The virtual signal circuit 101 generates a DC virtual signal to the slave telecommunication apparatus in the silent operation mode to enable entirely silent operation. According to the above-mentioned method, the generation of the DC virtual signal is variable according to the virtual signal circuit design. The detailed structure of the virtual signal circuit 101 is disclosed by the following figures. It should be noted that the detailed structures of the virtual signal circuit are only meant to be examples and are not meant to limit the scope of the present invention. Persons skilled in the art may change the structure of the virtual signal circuit 101 to reach the same purpose.

Figure 2:
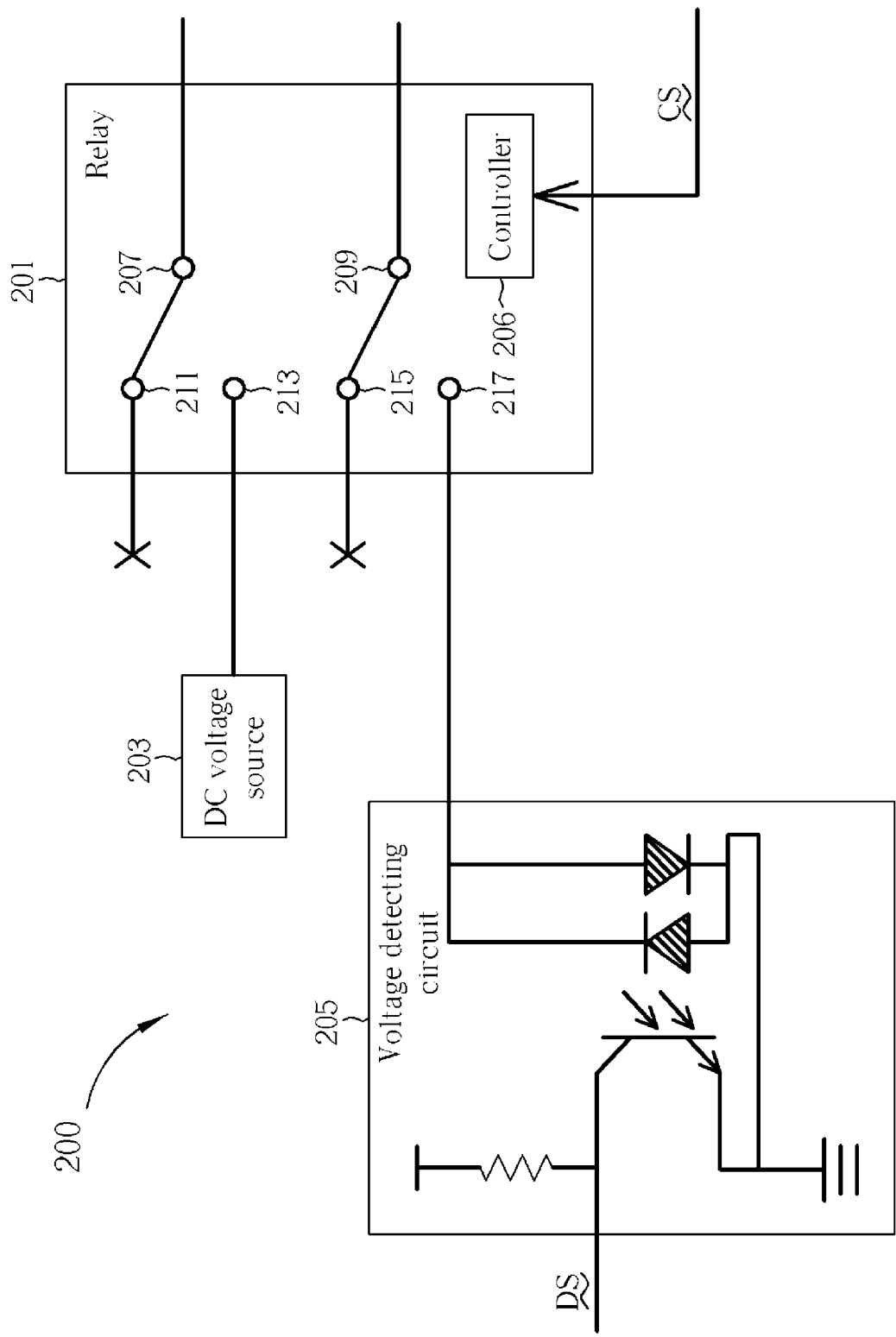
FIG. 2 is a schematic diagram illustrating a virtual signal circuit according to the first embodiment of the present invention.

FIG. 2 is a schematic diagram illustrating a virtual signal circuit 200 according to the first embodiment of the present invention. As shown in FIG. 2, the virtual signal circuit 200 includes a relay 201, a DC voltage source 203, and a voltage detecting circuit 205. The relay 201 includes a controller 206, a virtual tip terminal 207, a virtual ring terminal 209, a first terminal 211, a second terminal 213, a third terminal 215 and a fourth terminal 217.

The controller 206 is used to receive the control signal CS for controlling the operation of the relay 201, wherein the control signal CS can be a switching signal. In the normal operation mode, the virtual tip terminal 207 and the virtual ring terminal 209 are coupled to the first terminal 211 and the third terminal 215, that is, floating coupled. In this case, the slave telecommunication apparatus relay 105 is coupled to the tip terminal 107 and the ring terminal 109 for transmitting the telecommunication signal to the slave telecommunication apparatus, to enable the ring to sound in the normal operation mode, as shown in FIG. 1.

Additionally, in the silent operation mode, the virtual tip terminal 207 and the virtual ring terminal 209 are coupled to the second terminal 213 and the fourth terminal 217, and the slave telecommunication apparatus relay 105 shown in FIG. 1 is switched to the first input port 111, 113 which coupled to the virtual tip terminal 207 and the virtual ring terminal 209. Next, the voltage provided by the DC voltage source 203 is used as a DC virtual signal to be outputted to the slave telecommunication apparatus. Thus, the slave telecommunication apparatus can be informed of the telecommunication signal without operating the ring. As described above, the DC voltage source 203 is the inner voltage source of the telecommunication system 100. In this embodiment, the DC voltage source 203 is from the circuit board of the telecommunication system 100, wherein the voltage is 25~50 V, thus the DC voltage source 203 can be used as the DC virtual signal inputted to the slave telecommunication apparatus. Under the application of the DC virtual signal, the slave telecommunication apparatus can be informed of the entrance of the telecommunication signal without operating the ring. The main telecommunication apparatus can still display related information of persons who make a phone call, such as number, name and address from PSTN.

In the silent operation mode, if there is any Off-Hook (or On-Line) operation on the slave telecommunication (i.e. the user puts a call through to the telecommunication apparatus), there will be some variation of the DC virtual signal. Also, the voltage detecting circuit 205 detects the voltage variation and generates a detecting signal DS to inform the main telecommunication apparatus and stop the control signal CS (i.e. make the virtual signal circuit 200 stop generating the DC virtual signal). The virtual tip terminal 207 and the virtual ring terminal 209 are switched to the first terminal 211 and the third terminal 215, and the slave telecommunication apparatus relay 105 is switched to the tip terminal 107 and the ring terminal 109 to enable the user of the slave telecommunication apparatus to receive the telecommunication signal from the tip terminal 107 and the ring terminal 109. In this embodiment, the voltage detecting circuit 205 is a photo coupler, the detailed structure of which is shown in FIG. 2. Since the structure and operation of the photo coupler is well known by persons skilled in the art, it is omitted for brevity.

Figure 3:
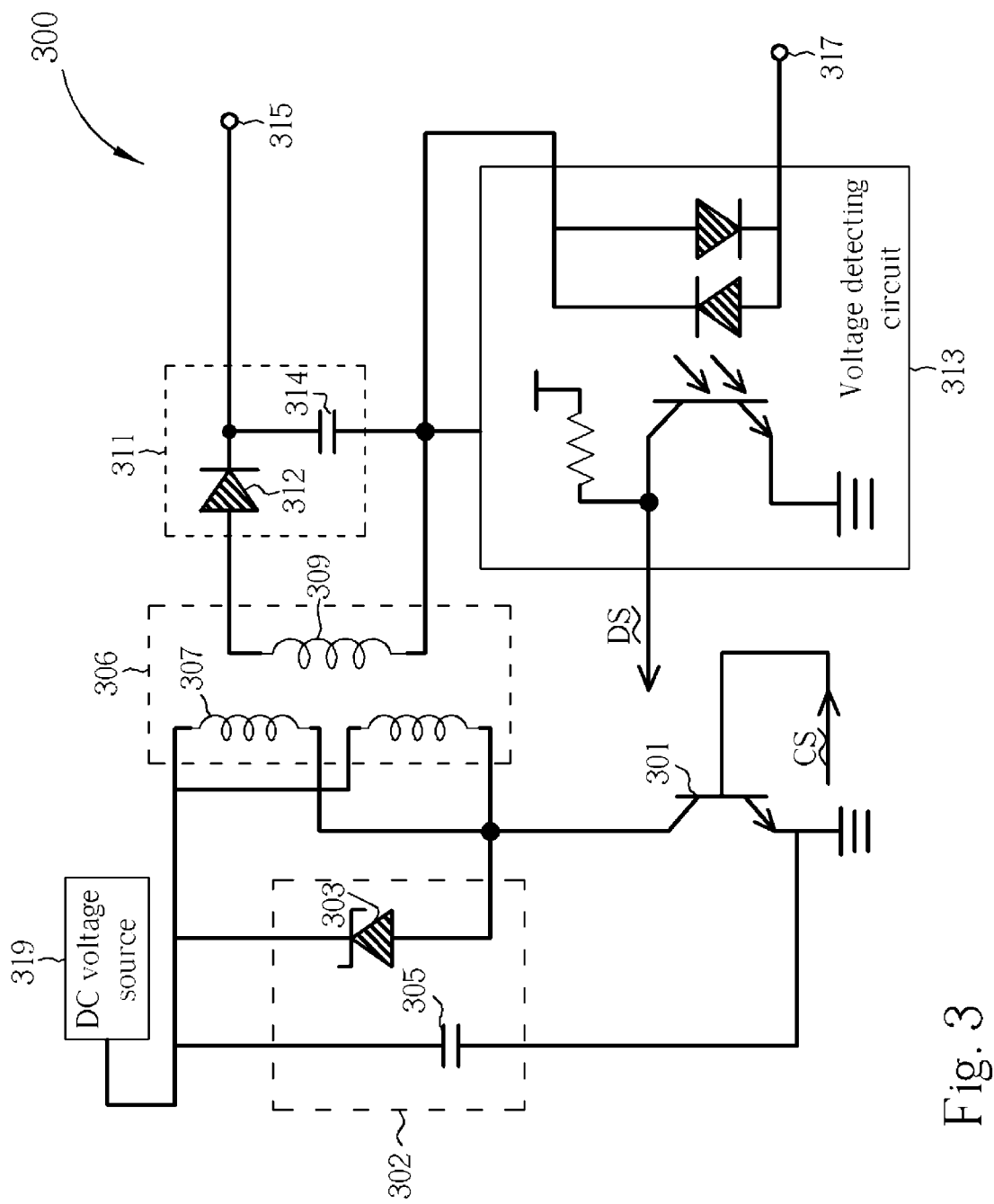
FIG. 3 is a schematic diagram illustrating a virtual signal circuit according to the second embodiment of the present invention.

FIG. 3 is a schematic diagram illustrating a virtual signal circuit 300 according to the second embodiment of the present invention. As shown in FIG. 3, the virtual signal circuit 300 includes a DC voltage source 319, a voltage detecting circuit 313, a voltage transformer, which comprising a transistor 301, a voltage stabilizing and rectifier circuit 302, a transformer 306, a rectifier and filter circuit 311. The virtual signal circuit 300 further comprises a virtual tip terminal 315 and a virtual ring terminal 317. The operation of the transistor 301 is controlled by the control signal CS, and the control signal CS can be a PWM (pulse width modulation) signal. The DC voltage source 319 can be an inner voltage of the telecommunication system, the voltage of which is about 5 V. In this embodiment, the voltage stabilizing and rectifier circuit 302 includes a diode 303 and a capacitor 305 for providing a stable first voltage level to the transformer 306, and the diode 303 can be a Schottky diode or other diodes. The DC voltage source 319 provides a first voltage level to the transformer 306, and the transformer 306 then generates a second voltage level according to the first voltage level and the operation of the transistor 301, wherein the second voltage level is an AC voltage. After that, the rectifier and filter circuit 311 rectifies the AC second voltage level to form a stable DC virtual voltage signal and transmits it to the slave telecommunication apparatus through the virtual tip terminal 315 and the virtual ring terminal 317. In this embodiment, the rectifier and filter circuit 311 includes a switching diode 312 and a capacitor 314, but this is not a limitation of the scope of the present invention.

In the normal operation, the control signal CS is not generated, and thus the virtual signal circuit 300 does not work. In this case, the slave telecommunication apparatus relay 105 is coupled to the tip terminal 107 and the ring terminal 109 and transmits the telecommunication signal to the slave telecommunication apparatus to operate the ring of the slave telecommunication apparatus (as shown in FIG. 1).

In the silent operation mode, the slave telecommunication apparatus relay 105 is switched to the first input port 111, 113 which are coupled to the virtual tip terminal 315 and the virtual ring terminal 317, and the DC virtual signal is transmitted to the slave telecommunication apparatus through the virtual tip terminal 315 and the virtual ring terminal 317. According to the DC virtual signal, the slave telecommunication apparatus can be informed of the existence of the telecommunication signal without operating the ring (as shown in FIG. 1). Furthermore, the main telecommunication apparatus can still display related data of persons who make a phone call, such as number, name, and address from PSTN.

In the silent operation mode, if there is any Off-Hook (or On-Line) operation on the slave telecommunication apparatus (i.e. the user puts a call through to the telecommunication apparatus), there will be some variation of the voltage level of the DC virtual signal. Also, the voltage detecting circuit 313 detects the voltage variation and generates a detecting signal DS to inform the main telecommunication apparatus to stop the control signal CS. The slave telecommunication apparatus relay 105 shown in FIG. 1 is switched to the tip terminal 107 and the ring terminal 109 to enable the user of the slave telecommunication apparatus to receive the telecommunication signal from the tip terminal 107 and the ring terminal 109. In this embodiment, the voltage detecting circuit 313 is a photo coupler as shown in FIG. 3. Since the structure and operation is well known by persons skilled in the art, it is omitted for brevity.

In order to follow the safety rules of the public switched telephone network and limit the voltage and current, the present invention designs a voltage rising circuit utilizing the turns ratio and wire diameter characteristics of the transformer 306 to reach the purpose of isolating and protecting. In this embodiment, the preferred turns ratio of the coils 307, 309 of the transformer 306 is 0.1:1 (12 Ts and 120 Ts). After the first voltage level enters the transformer 306, a second voltage level near 50 V is generated, and the output current is 90 mA. In this embodiment, the control signal CS is a PWM (pulse width modulation) with a frequency about 55 KHz. It should be noted that the parameters are only given as examples and are not meant to limit the scope of the present invention.

The second embodiment of the present invention can generate a virtual signal to enable the slave telecommunication apparatus to operate silently without adding outer power sources, and conform to the safety rules by adjusting the turns ratio and wire diameter characteristics of the transformer.

Figure 4:
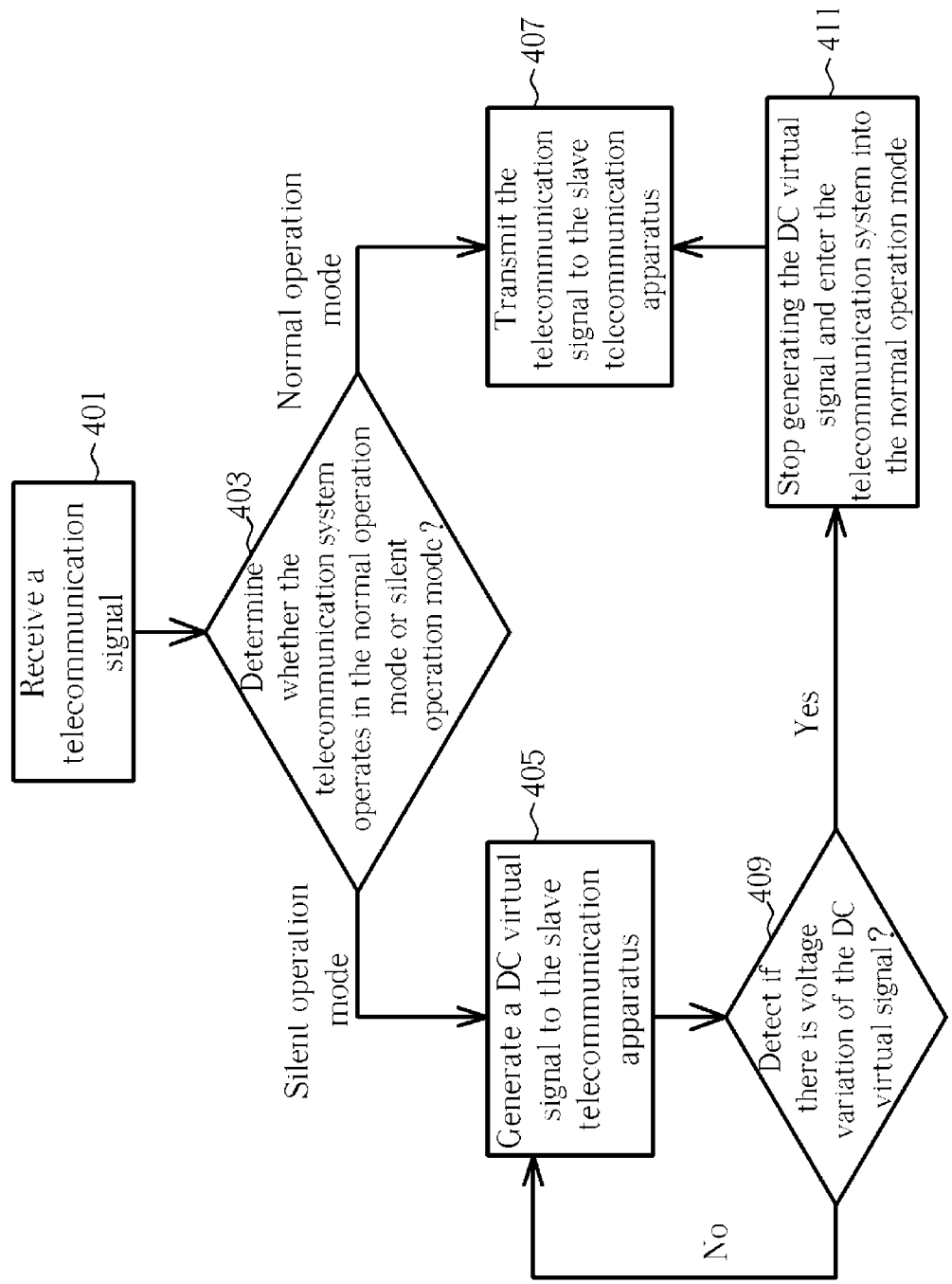
FIG. 4 is a flow chart illustrating a method for silently operating the telecommunication system corresponding to the apparatus shown in FIG. 1 to FIG. 3.

FIG. 4 illustrates a method for silently operating a telecommunication system corresponding to the apparatus shown in FIG. 1 to FIG. 3. As shown in FIG. 4, the method includes:

Step 401:
Receive a telecommunication signal.
Step 403:
Determine whether the telecommunication system operates in the normal operation mode or silent operation mode. If silent operation mode, enter step 405. If normal operation mode, enter step 407.
Step 405:
Generate a DC virtual signal to the slave telecommunication apparatus.
Step 407:
Transmit the telecommunication signal to the slave telecommunication apparatus.
Step 409:
Detect if there is voltage variation of the DC virtual signal. If none, go back to step 405 and keep transmitting the DC virtual signal to the slave telecommunication apparatus. If yes, go to step 411.
Step 411:
Stop generating the DC virtual signal and enter the telecommunication system into the normal operation mode.

It should be noted that step 409 and step 411 can be omitted from the method. Additionally, the method can transmit different signals to the slave telecommunication apparatus and apply other operations or functions. This also falls in the scope of the present invention.

Furthermore, the methods shown in FIG. 4 can be applied to the apparatus shown in FIG. 2 or any other apparatus with the same function of utilizing the voltage from the DC voltage source as the DC virtual signal to the slave telecommunication apparatus in the silent operation mode. Or, the methods shown in FIG. 4 can be applied to the apparatus shown in FIG. 3 or any other apparatus with the same function of generating a DC virtual signal corresponding to a second voltage level to the slave telecommunication apparatus in the silent operation mode, wherein the second voltage level is according to a first voltage level and is higher than or equal to the first voltage level.

Further description and limitations related to the above-mentioned method are disclosed in FIG. 1 to FIG. 3, and thus omitted for brevity.

Moreover, according to the above-mentioned circuit and method, the state of the slave apparatus can be set on the main apparatus for performing silent operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A telecommunication system capable of silent operation, comprising:
    a main telecommunication apparatus;
    at least one slave telecommunication apparatus serially coupled to the main telecommunication apparatus; and
    a virtual signal circuit coupled to the main telecommunication apparatus and the slave telecommunication apparatus for generating a direct current (DC) virtual signal to the slave telecommunication apparatus for informing the slave telecommunication apparatus of an input of a telecommunication signal and causing the slave telecommunication apparatus not to operate a ring when the telecommunication system operates in a silent operation mode and for transmitting the telecommunication signal to the slave telecommunication apparatus when the telecommunication system operates in a normal operation mode.

2. The system of claim 1, wherein the main telecommunication apparatus and the slave telecommunication apparatus is at least one selected from the group consisting of a telephone machine, a fax machine, an answering machine and a multifunction peripheral.

3. The system of claim 1, wherein the virtual signal circuit generates the DC virtual signal corresponding to a second voltage level to the slave telecommunication apparatus according to a first voltage level, where the second voltage level is higher than or equal to the first voltage level.

4. The system of claim 3, wherein the virtual signal circuit comprises:
    a voltage transformer coupled to the main telecommunication apparatus and the first voltage level for generating the DC virtual signal corresponding to the second voltage level according to the first voltage level; and
    a voltage detecting circuit for detecting a voltage variation of the DC virtual signal to generate a detecting signal for informing the main telecommunication apparatus if there is any Off-Hook (On-Line) operation on the slave telecommunication apparatus;
    wherein the main telecommunication apparatus selectively controls the telecommunication system to enter into the silent operation mode or the normal operation mode according to the detecting signal.

5. The system of claim 4, wherein the voltage transformer is a switching power transformer.

6. The system of claim 5, wherein the voltage transformer is driven by a pulse width modulation signal, and the telecommunication system stops the pulse width modulation signal while the virtual signal circuit enters into the normal operation mode.

7. The system of claim 6, wherein the voltage transformer further comprises:
    a transistor coupled to the pulse width modulation signal for turning on or off according to the pulse width modulation signal;
    a transformer coupled to the transistor for generating the second voltage level according to the first voltage level and an operation of the transistor; and
    a rectifier and filter circuit coupled to the transformer for rectifying the second voltage level to generate the DC virtual signal corresponding to the second voltage level.

8. The system of claim 7, wherein the voltage transformer further comprises a voltage stabilizing and rectifier circuit, for providing the stable first voltage level to the voltage transformer.

9. The system of claim 7, wherein the second voltage level is according to safety rules of a public switched telephone network (PSTN).

10. The system of claim 3, wherein the virtual signal circuit is located in the main telecommunication apparatus.

11. The system of claim 1, wherein the virtual signal circuit is coupled to a DC voltage source for utilizing a voltage from the DC voltage source as the DC virtual signal to the slave telecommunication apparatus in the silent operation mode.

12. The system of claim 11, wherein the virtual signal circuit further comprises:
    a voltage detecting circuit for detecting a voltage variation of the DC virtual signal to generate a detecting signal for informing the main telecommunication apparatus if there is any Off-Hook (On-Line) operation on the slave telecommunication apparatus; and
    a relay having a first terminal, a second terminal coupled to the DC voltage source, a third terminal, a fourth terminal coupled to the voltage detecting circuit, a virtual tip terminal and a virtual ring terminal both coupled to the slave telecommunication apparatus, wherein the relay electrically connects the second terminal to the virtual tip terminal and electrically connects the fourth terminal to the virtual ring terminal for transmitting the DC virtual signal to the slave telecommunication apparatus in the silent operation mode, and the relay electrically connects the first terminal to the virtual tip terminal and electrically connects the third terminal to the virtual ring terminal to the slave telecommunication apparatus in the normal operation mode,
    wherein the main telecommunication apparatus selectively controls the telecommunication system to enter into the silent operation mode or the normal operation mode according to the detecting signal.

13. The system of claim 11, wherein the virtual signal circuit is located in the main telecommunication apparatus.

14. A method for silently operating a telecommunication system, which includes a main telecommunication apparatus and at least one slave telecommunication apparatus serially coupled to the main telecommunication apparatus, the method including:
    (a) utilizing the main telecommunication apparatus to receive a telecommunication signal;
    (b) determining whether the telecommunication system operates in a silent operation mode or a normal operation mode; and
    (c) generating a direct current (DC) virtual signal to the slave telecommunication apparatus for informing the slave telecommunication apparatus of an input of the telecommunication signal and causing the slave telecommunication apparatus not to operate a ring if the telecommunication system operates in the silent operation mode, or transmitting the telecommunication signal to the slave telecommunication apparatus if the telecommunication system operates in the normal operation mode.

15. The method of claim 14, wherein the main telecommunication apparatus and the slave telecommunication apparatus is at least one selected from the group consisting of a telephone machine, a fax machine, an answering machine and a multifunction peripheral.

16. The method of claim 14, wherein the step (c) further comprises:
    generating the DC virtual signal corresponding to a second voltage level to the slave telecommunication apparatus according to a first voltage level, wherein the second voltage level is higher or equal to the first voltage level.

17. The method of claim 14, wherein the step (c) utilizes a voltage from a DC voltage source as the DC virtual signal to the slave telecommunication apparatus in the silent operation mode.

18. The method of claim 14, further comprises:
   detecting a voltage variation of the DC virtual signal to generate a detecting signal informing the main telecommunication apparatus if there is any Off-Hook (On-Line) operation on the slave telecommunication apparatus;
   wherein the main telecommunication apparatus selectively controls the telecommunication system to enter into the silent operation mode or the normal operation mode according to the detecting signal.

19. The system of claim 1, further comprising:
   a slave telecommunication apparatus relay coupled between the slave telecommunication apparatus and the virtual signal circuit, wherein the slave telecommunication apparatus relay has first input ports coupled to the virtual signal circuit for receiving the DC virtual signal, second input ports for receiving the telecommunication signal, and output ports coupled to the slave telecommunication apparatus, wherein the slave telecommunication apparatus relay respectively connects the first input ports to the output ports in the silent operation mode, and respectively connects the second input ports to the output ports in the normal operation mode.

* * * * *